C. B. Wright.
Portable Derrick.
Nº 71833     Patented Dec. 3, 1867
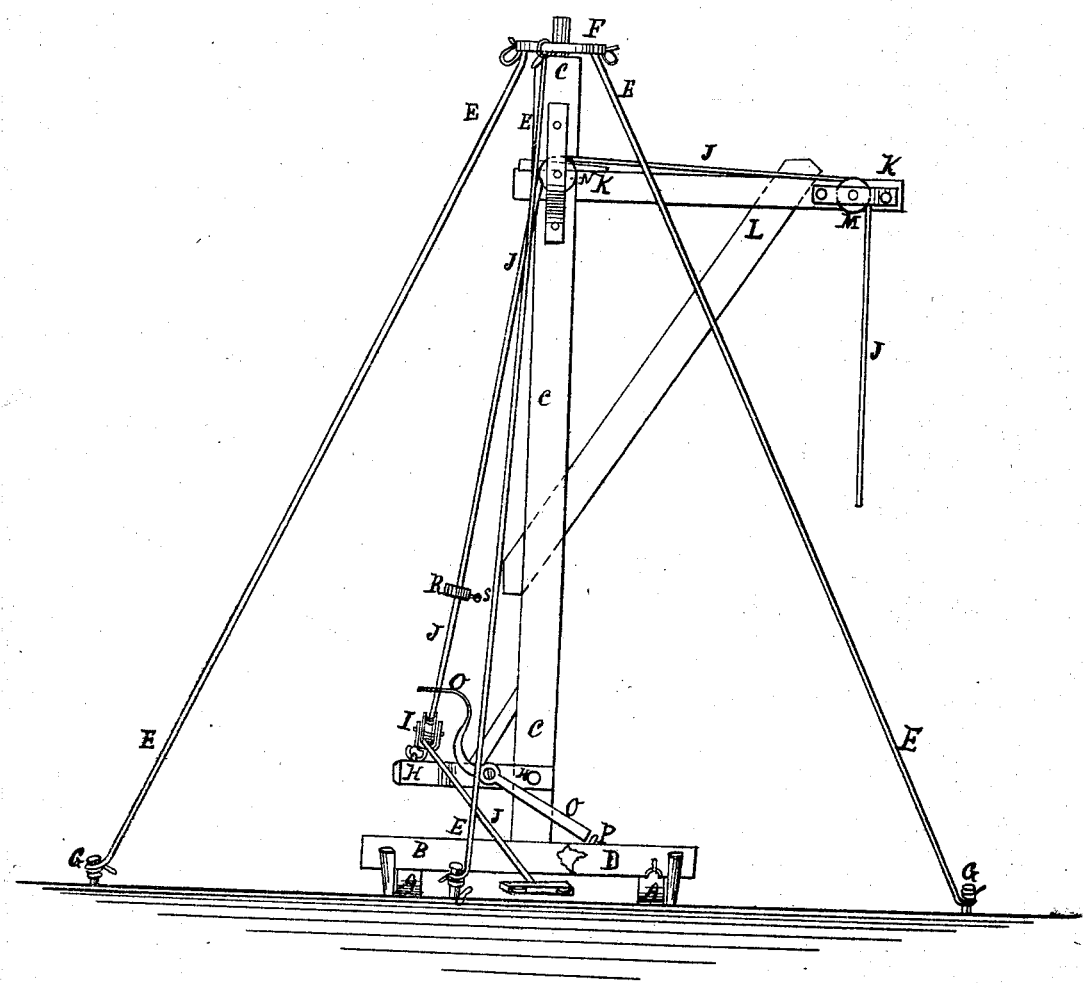

United States Patent Office.

CHATHAM B. WRIGHT, OF BELMONT, OHIO.

Letters Patent No. 71,833, dated December 3, 1867.

---

IMPROVEMENT IN PORTABLE DERRICK.

---

The Schedule referred to in these Letters Patent and making part of the same.

---

TO ALL WHOM IT MAY CONCERN:

Be it known that I, CHATHAM B. WRIGHT, of Belmont, in the county of Belmont, and State of Ohio, have invented a new and improved Portable Derrick; and I do hereby declare that the following is a full, clear, and exact description thereof, which will enable others skilled in the art to make and use the same, reference being had to the accompanying drawing, forming a part of this specification, in which the figure is a side view of my improved derrick, part being broken away to show the construction.

A are the ground-sills of the base-frame, the end edges of the lower side of which are rounded off, as shown in the figure, so that they may act as runners in drawing the machine from place to place. The sills A are connected and held in their proper relative positions by the cross-timbers B. C is the upright shaft of the derrick, the lower end of which revolves in a socket formed in the platform D for its reception. The platform D is hinged at one side to the base-frame A B, so that the upright parts of the derrick may be readily turned down, for convenience in moving it from place to place. The shaft C is held and secured in an upright position by the guy-ropes E, the upper ends of which are attached to the block F, to which the upper end of the shaft C is pivoted. The lower ends of the guy-ropes E are secured to pins or stakes G, driven into the ground. H is the jack-sweep, the inner end of which is securely attached to the shaft C, near its lower end, and to the outer end of which is attached the guide-pulley I, around which the hoisting-rope J passes. K is the sweep or arm of the derrick, the inner end of which is securely attached to the upper part of the shaft C, and the outer end of which is supported by the inclined brace L, as shown in the drawing. To the outer end of the sweep K is attached the guide-pulley M, around which the hoisting-rope J passes. N is a pulley, attached to the upper part of the shaft C, for the passage of the hoisting-rope J. O is a pawl, pivoted to the side of the jack-sweep H, through the upper end of which is formed a hole for the passage of the hoisting-rope J. The other or lower end of the pawl O rests against the catch P, holding the shaft C stationary while the hay is being hoisted. R is a block, through which the rope J passes, and which is held in place by a set-screw, S, so that it may be adjusted in any desired position upon the rope J.

In using the derrick, as the advance of the horse raises the fork-load of hay, the block R strikes the upper end of the pawl O, and, depressing it, raises the lower end of said pawl from the catch P. This allows the hoisting-rope to revolve the derrick, swinging the hay directly over the centre of the stack, where it is dropped from the fork in the ordinary manner. The derrick is then revolved back to its former position, ready to hoist another fork-load, the pawl O catching upon the catch P, and holding the derrick again stationary. As the stack increases in height, the position of the tripping-block R is shifted, so as to revolve the derrick when the fork-load has been raised to the proper height.

By this arrangement, the hay is always dropped at the centre of the stack, making it more convenient for the builder, and at the same time removing the cause of the tendency of the stack to settle to the side at which the hay has been pitched, and thus allowing it to settle true.

Having thus described my invention, what I claim as new, and desire to secure by Letters Patent, is—

The pawl O and adjustable tripping-block R, in combination with the revolving derrick D C H K, and hoisting-rope J, substantially as herein shown and described, and for the purpose set forth.

The above specification of my invention signed by me, this 20th day of August, 1867.

CHATHAM B. WRIGHT.

Witnesses:
WILLIAM A. DERMOT,
JENKINSON WRIGHT.